Dec. 21, 1937.  F. H. SCHOENFELD  2,102,752
VALVE MECHANISM
Filed Oct. 24, 1935   3 Sheets-Sheet 1

INVENTOR.
Frank H. Schoenfeld,
BY Justin W. Macklin
ATTORNEY.

Dec. 21, 1937.　　　F. H. SCHOENFELD　　　2,102,752
VALVE MECHANISM
Filed Oct. 24, 1935　　　3 Sheets-Sheet 2

INVENTOR
Frank H. Schoenfeld,
BY Justin W. Macklin,
ATTORNEY

Dec. 21, 1937.  F. H. SCHOENFELD  2,102,752

VALVE MECHANISM

Filed Oct. 24, 1935  3 Sheets-Sheet 3

INVENTOR.
Frank H. Schoenfeld,
BY Justin W. Mechlin
ATTORNEY.

Patented Dec. 21, 1937

2,102,752

UNITED STATES PATENT OFFICE 2,102,752

VALVE MECHANISM

Frank H. Schoenfeld, Cleveland Heights, Ohio

Application October 24, 1935, Serial No. 46,543

6 Claims. (Cl. 236—48)

This invention relates to a valve operating mechanism for controlling the flow of fluid consequent upon changing conditions such as the rise or fall in temperatures.

The general objects of the invention include the provision of such a device which shall operate automatically and effectively in opening and closing of a valve such, for example, as the supply of gas to a burner, and which shall be very dependable in its operation.

Further objects are to so construct such a device that it may be very economically manufactured and readily assembled with accuracy and which shall thereafter be very uniform and responsive to precise ranges of temperature.

The particular device of this application is of that character known as snap action valve operating mechanisms, adapted particularly to work in conjunction with valves normally seated or opened by spring means, so that the valve operating mechanism, which may consist of a plurality of co-acting levers normally constrained to either side of a neutral position, results in quick acting of the levers and the opening or closing of the valve, as the case may be.

Further specific objects of the invention are to so arrange a toggle or snap action assembly in a carrier frame that it may be accurately positioned in a housing such as a casting having space therefor, and also having a housing for the associated valve, and fittings for the attachment for the thermo-responsive operating means.

A further specific object is to so arrange such a lever assemblage that it shall include a main lever and coacting valve lever, and shall have provision for two pivot positions for the main lever so that it may serve either to hold the valve open and permit it to close upon temperature change, or may act to open the valve, as, for example, on the lowering of the temperature of the material or fluid being heated, to open the valve and thus permit the flow of gas through the supply line.

Another specific object is to provide for the convenient adjustment of the lever carrying mechanism with relation to the thermo-responsive means for varying the operating ranges of temperature when the device is assembled and even during its normal operation.

Additional objects will become more apparent from the following description, which relates to drawings showing a preferred embodiment of my invention.

In the drawings, Fig. 1 is an elevation partly in section, of a hot water heater equipped with a valve for normally regulating temperature; another valve for shutting off the gas supply at high temperature, and still another known as the "safety pilot", to shut off the gas consequent upon absence of the pilot flame.

Figure 1:
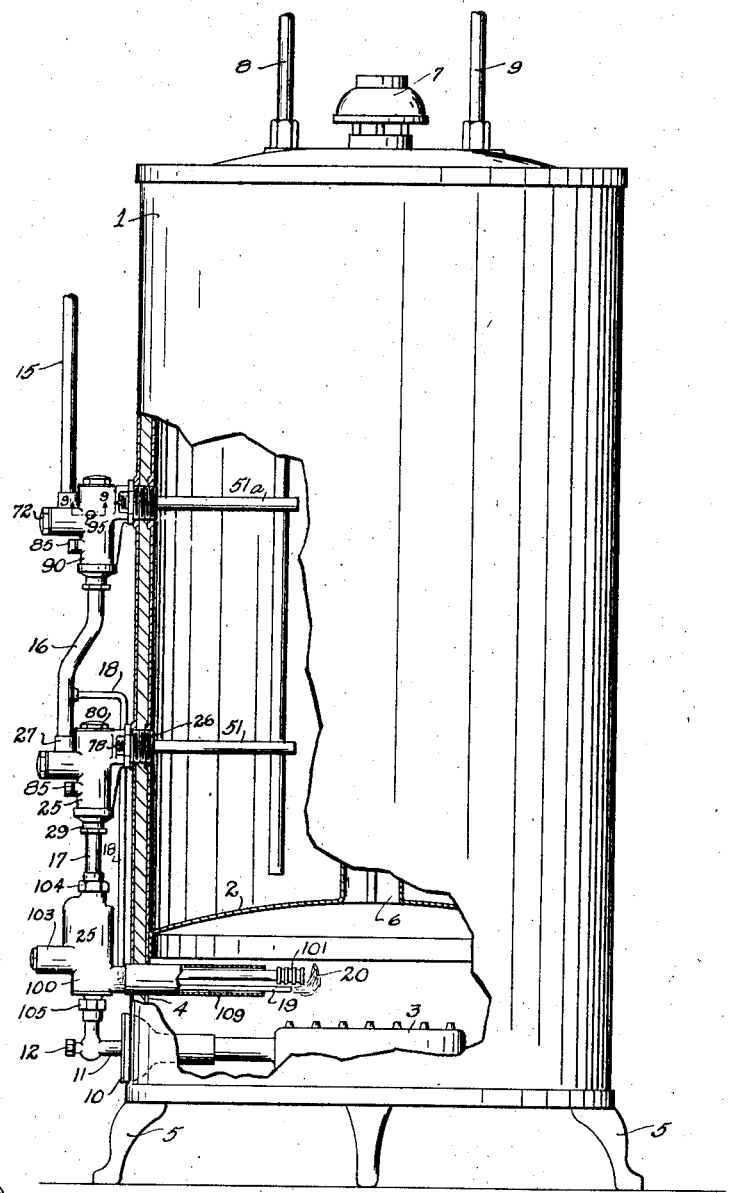

In the drawings, 1 indicates the storage water heater shown as comprising an insulated tank. Below the bottom 2, of the tank proper is the usual gas burner 3 within a skirt-like extension 4 of the outer casing or cylindrical wall of the tank, and which is mounted on suitable supports or feet 5, the usual central flue 6 is shown as leading through the tank, while 7 indicates a suitable draft hood.

The pipe 8 is a cold water supply while 9 is the hot water pipe leading from the tank. The burner 3 shown as provided with the usual mixer 10 and gas supply pipe 11 leading thereto, which may have a manually operating regulator valve indicated at 12. A main gas supply line 15 leads to the valve 12 through the three control valve devices which are shown as connected by pipes 16 and 17.

From above the normal temperature control valve and thus from the pipe 16 is the pilot gas line 18 leading to the pilot burner 19, the flame of which is indicated at 20. By this arrangement the pilot may burn at all times independently of the control valves below this connection.

The temperature control valve is designated generally 25 and as stated it comprises a housing, preferably a casting, on which is formed a threaded boss 26 fitted into the side of the tank as shown, and also provided with bosses 27 and 29 in which the pipes 16 and 17 are fitted, providing gas flow therethrough under the control of the valve in this housing.

The temperature valve is shown particularly in Figs. 2 to 5. The interior of the housing is suitably broached to provide four seats for the lever carrying frame 30. These seats are indicated at 31, 32, and the frame member which comprises the stamped and formed sheet metal part is provided with corresponding shoulders 33, fitting the seats 31, and shoulders 34 and 35 fitting the broached seats 32. The shoulders 33, being formed by the cut-out portions of the metal, leaving openings in the sides of the frame member and faced to form right angle shoulders, permit an effective and economical manufacture, while the assembly is simplified in that the frame with the levers therein may be merely pressed into the housing, causing the shoulders just described to seat firmly into the broached seats in the casting.

The sides of the frame 30 provide a pair of shoulders 36 and an adjacent pair of shoulders 38 spaced therefrom, the utility of which hereinafter appears.

Figure 4:
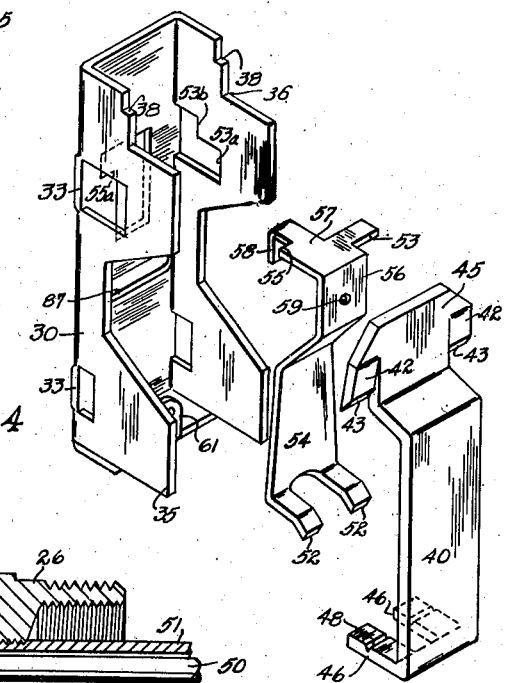
Fig. 4 is a composite perspective view showing the frame and co-acting levers in separate relation.

In the form of valve shown, the main lever 40 is formed of a single strip of metal having integral portions 42 formed with the knife edges 43 for the pivot elements proper. The lever is offset toward the portion 45 above the pivots, as shown in Figs. 2 and 4, and bifurcated portions 46 are turned inwardly at substantial right angles to the body of the lever, and on these are formed notches or seats 48 for the knife-edge pivots 52 of the secondary or valve actuating lever member 54.

It will be noted that the lever 54 is also bifurcated and pivot carrying portions thus formed extend from the body of the lever toward the lever 40, while near its upper end the lever is offset, then extending substantially parallel with the main portion as at 56, and thence again at right angles forming a projecting portion 57 carrying the downwardly extending valve actuating abutment 58.

In the portion 56 of the lever 54 is formed an opening 59 for receiving the hooked end of a spring 60. The offset end of this spring is hooked in an opening in an upturned lip 61 formed by bending up a portion of the frame metal 30 substantially midway between the sides and approximately in line with the pivot shoulder 36, and which lip projects between the bifurcated or separated members 46 and pivot members 52.

Figure 2:
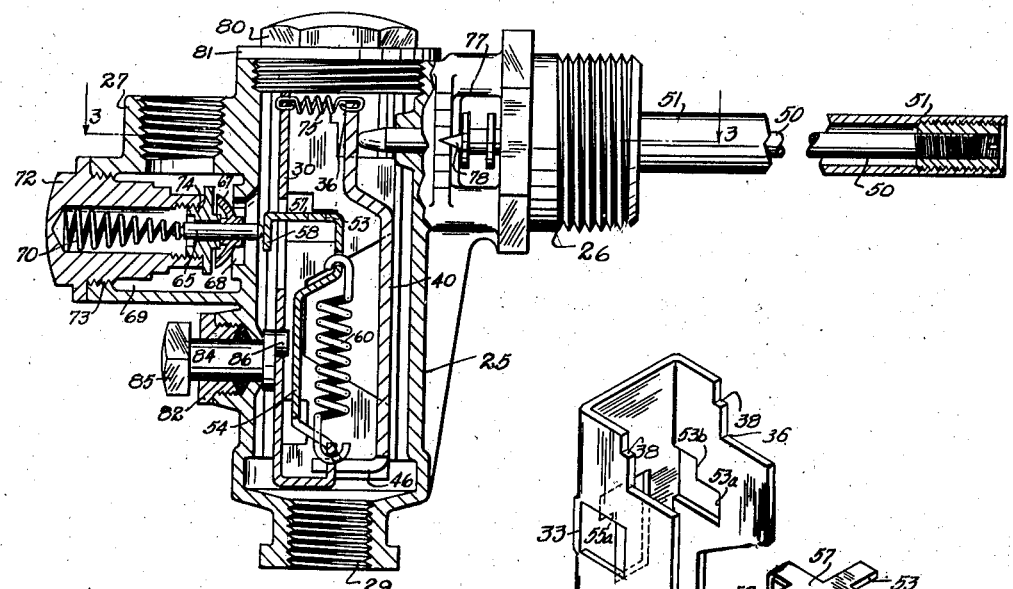
Fig. 2 is an elevation, partly in section, of an assembled valve actuating device.

When the levers and frame are assembled as shown in Fig. 2, the tension of the spring acts to hold the levers in retracted position, allowing the valve to be closed. Upon inward movement of the end of the thermal bar 50 pressing against the portion 45 of the main lever 40, the lower end of this main lever is swung to the right of the Fig. 2, carrying the knife-edge pivots 52 to the right of the lower anchorage of the spring 60, with the result that the upper end of the lever 54 is swung toward the left, causing the abutment 58 to impinge the valve carrying pin 65. This lifts the valve member 67 from its seat 66, opening the gas passage from the chamber 69 to the main body of the casing and permitting gas to pass from the pipe 16 to the pipe 17, and thence to the burner 3.

On retraction of the thermostatic bar 50, caused by its tube 51 becoming hotter, the lever 40 swings again to the right, moving the pivot points of the lever 52 to the left of the anchor point 61, and the upper end of the spring then retracts the valve lever 54, whereupon a spring 70 pressing against the pin 65 causes the valve to seat. This spring 70 is shown as carried in the valve guide member, which comprises a threaded body 72 having a wrench receiving portion at the outer end, threaded at 73 into the casing and at the inner end receiving a guide member 74 threaded thereto and loosely carrying the valve pin 65.

In order to relieve the strain upon the thermostat rod 50, and to assure a more certain actuation and consequent operation of the valve, I may partially counterbalance the force of the spring 60 and valve spring 70 by the use of a spring 75 attached to the outer end of the portion 45 of the lever 40 and to the frame member 30, as shown in Fig. 2.

This spring is arranged to exert constant tension on the lever 40 but insufficient to swing the lever of itself. However, it aids in the moving of the lever against the action of the other springs when the thermostat bar expands.

The inward and outward movement of the lever 58 may be limited by shoulders 53 and 55 impinging against corresponding shoulders 53a and 55a, presented at openings in the side and back of frame member 30 respectively, it being understood that the projection 58 moves through the opening at the back of the frame while the projection 53 moves in an opening at the side.

Figure 3:
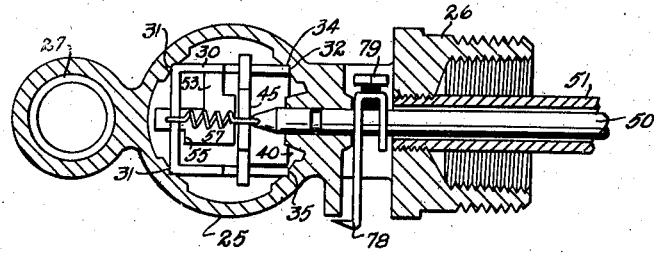
Fig. 3 is a horizontal section taken on the line 3—3 of Fig. 2.
Figure 5:
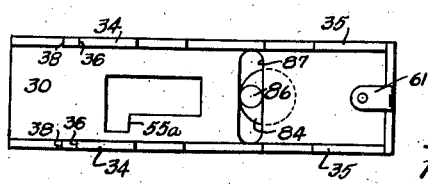
Fig. 5 is an elevation of the lever frame.

The usual temperature range adjustment such as shown and described in my prior pending application, Serial No. 23,787, filed May 27, 1935, is also shown in Figs. 2 and 3. An opening 77 extends through the casting inside of the boss 26 forming a space for an indicating lever 78 and secured to the bar 50 by a screw 79, and by which the bar 50 may be turned, causing its movement toward or from the lever 45 by reason of the screw connection of the rod 50 with its housing 51.

As stated, the frame is fitted tightly into the seat portions 31 and 32. In the position shown, the frame is in its uppermost position, to which it is tightly pressed by the action of the flange and threaded cap member. The flange 81, seating on a finished surface at the top of the housing, provides for the inner surface of the cap member engaging the frame member 30, establishing a definite distance to which this lever carrying frame is moved in the first assembly.

This is normally a satisfactory position for the proper valve operation. However, further adjustment may be provided by any suitable means of raising and lowering the frame within the housing and without opening the housing. A stuffing box element indicated at 82 serves as a carrier for a rotatable pin 84, provided with a wrench receiving portion (85) or wing, as the case may be, at the outer end, and at the inner end being provided with an enlarged portion carrying an eccentric pin 86, projecting through a slot 87 in the wall of the housing 30; whereby when this element 84 is turned, the pin 86 may cause the movement of the frame in the housing, thus changing the distance between the knife-edge pivot point 36 and the center line of the thrust thermostat bar 50.

This effects a change in the range of temperature of the water. Thus, closer to the pivot, the thermal bar acts to effect opening and closing of the valve within ranges of a few degrees, say five or seven, for example, while, when further from the pivot, ranges of fifteen degrees or more result.

An advantage of the present invention is that the same mechanism precisely may be used for the safety high temperature shut-off and gas shut-off installations of the character described. As stated, such shut-off valve mechanism is shown as mounted higher in the tank than the regulator governing the normal temperature of the water in the tank.

As before, 90 indicates generally such a valve which comprises the casing carrying the lever assemblage and frame as before, except that the parts are set with the valve normally open, and upon the water reaching the high temperature around the tube 51a, the rod 50 is withdrawn, allowing the spring to act to close the valve.

This provides for a safety factor, preventing dangerously high temperatures being reached in the tank. In some places, this is required by law, and is desirable because some devices used for the regulator thermostat fail to function properly. Upon failure of the regulator, it will be seen that the valve of the member 90 will close as the temperature in the tank rises and will shut off the flow of gas. As heretofore stated, it is desirable to require manual re-setting, wherefore assurance may be had of personal attention after any failure of the thermostat valve device 25 to function.

Figure 9:
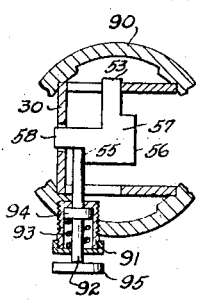
Fig. 9 is a sectional detail of the lock for the high temperature valve which requires manual re-seating after operation of that valve.

Such a re-setting device may be known as a safety lock, and may take any of many forms. I prefer, however, to provide a boss or sleeve 91 (Fig. 9) in the side of the valve housing, and through which extends a pin 92 normally resting at its inner end on the edge of the secondary lever at the portion 55 when the valve is in its open position, and urged inwardly by the action of a spring such as at 93 working against a suitable packing plunger 94 serving also to prevent gas leakage.

It will be seen that on movement of the lever 54, the pin 92 will be thrust inwardly and stand in the path of the shoulder 55 and will prevent the return of the lever to valve opening position, until the pin is withdrawn as by grasping the hand button 95.

The same lever mechanism may be used also for the safety pilot shut-off device shown generally at 100, and which as stated is responsive to the presence of the pilot flame to finally control the flow of gas to the burner. The purpose of these "safety pilot" devices is well-known in that they shut off the gas automatically so that the cooling of the tank and subsequent opening of the valve of device 25 will not cause unlighted gas to escape from the burner.

Figure 6:
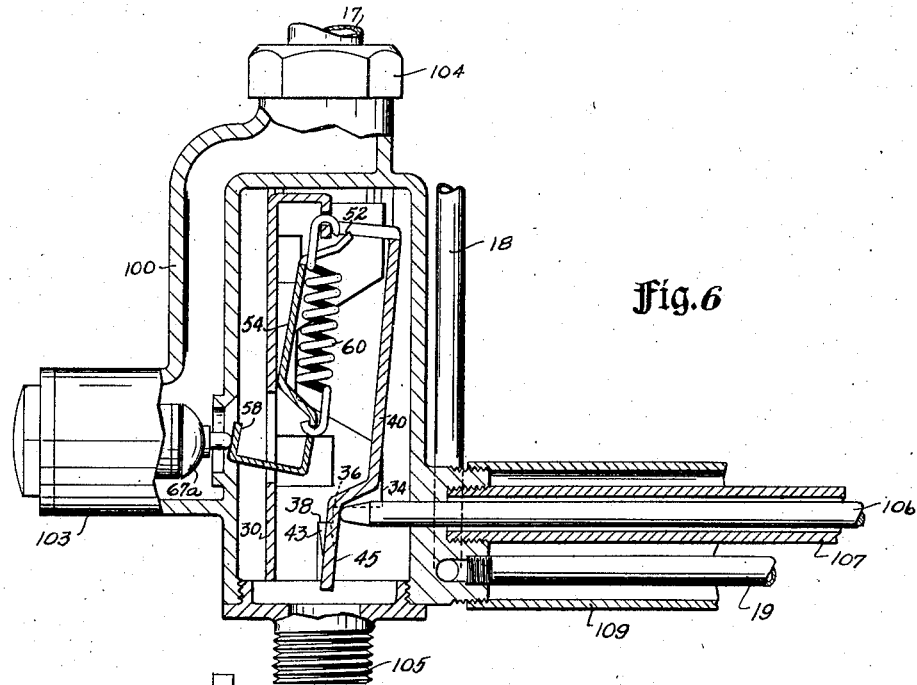
Fig. 6 is a vertical, longitudinal view, partly in section, of the device used for "safety pilot".

As stated, the pilot light line takes gas ahead of the thermostatic control valve 25 and remains burning normally independently of the condition of this valve. It is the purpose, therefore, of the valve device 100 to respond to a cooling condition resulting from the extinguishment of the pilot flame. The device is shown particularly in section in Fig. 6, and it will be seen that the temperature responsive device 101 stands over the pilot flame and is suitably threaded to a boss, and extends through the wall 4 of the heating chamber below the tank bottom.

A valve similar to the valve described in connection with Fig. 2 is mounted in boss 103 of the casing, and fittings 104 and 105 connect with the gas supply line 17 and 11.

The valve is normally held open and it is adapted to be closed by the withdrawal of the non-responsive thermal bar member 106 within the usual tube 107 which is more responsive to the temperature changes.

In this arrangement, the levers are preferably inverted from the position heretofore described and the main knife-edge pivots 43 are seated on the seats 38, while the spring 60 tends normally to hold the valve abutment 58, pressing the valve 67a to its open position. However, if the lever 40 be moved inwardly, that is, toward the left, the relative position of the lever pivots is changed with relation to the central line of the spring 60, and the lever 54 and its abutment 58 swing to the right, allowing the valve to close. The force exerted to effect this results from the contraction of the tube 107, pressing the inner end of the rod 106 against the lever 40, above its pivot 38, that is, toward the main body of the lever from this pivot. Thus, the valve is without any change except the shifting of the knife-edge pivots 43 from the seats 36 formerly used, thus positioning the point contact from the thermostat bar, as shown, renders this device effective to being responsive to the cooling of the thermo-responsive means, as in the absence of the pilot flame.

Around the pilot burner tube 19 and the thermal tube 107 is shown the usual, insulating and protective tube 109. Through the boss formed at the inner side of the valve casing 100 is a passage as appears in Fig. 6, the pipes or tubes 18 and 19 being suitably threaded thereto for the pilot gas.

Figure 7:
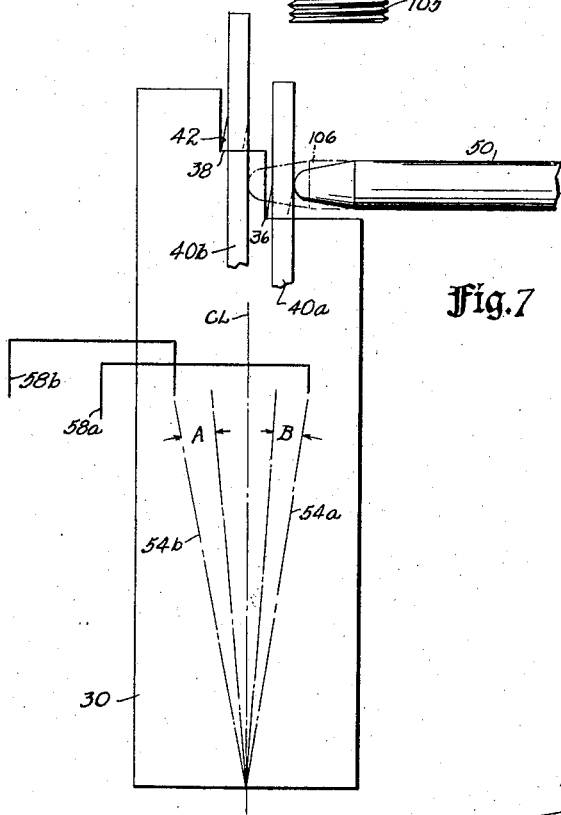
Fig. 7 is a diagrammatic view illustrating the manner of changing the device and assembled actuating levers with relation to the thermostatic element by shifting the pivot of the main lever.

In Fig. 7 is a diagrammatic illustration of the result of shifting the main lever from the seats 36 to the seat points 38, illustrating the change in relation of the pivot to the center line of the thermostatically responsive bar. In solid lines the bar 50 is shown as acting outside of the pivot, and in broken lines the bar 106 is shown as impinging against the lever 40 inside of the pivot.

The relative positions and relative movement of the valve abutment 58 are shown at either side of the central line conventionally marked CL, and the angles A and B respectively indicate the movement of the valve opening lever. Lines 54a and 58a indicate the valve closed position for the thermostat regulator, and 58b and 54b indicate the valve open position, when used as a safety pilot, the main lever 40 being designated 40a when in its position for use as a thermostat control, and designated 40b when in the pivot seats 38 for safety pilot use.

A projection 53 now works in a restricted portion of the opening in the side of the frame impinging the shoulder 53b, limiting the movement of the arm within the range indicated by the angle A. Other suitable stop means may be provided for such limiting movement. The opening being formed with the two shoulders is consistent with using the same frame member 30 for both uses of the valve actuating mechanism.

Figure 8:
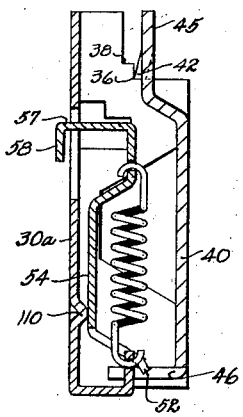
Fig. 8 shows a modified form of the levers and carrying frame.

A modified form is shown in Fig. 8 in which the valve has a gradual tilting action instead of the snap action. A secondary pivot member being provided in the form of a ridge 110 in the frame member 30a, engages the intermediate portion 54 of the valve actuating lever adjacent its lower end. Thus as the lever 54 rocks or tilts over the pivot 110 with a teetering action the valve is definitely opened varying or graduated amounts according to the position given the lever 40 in response to the movement of the temperature responsive device acting upon the end 45 of the main lever.

One of the advantages of this construction is that it is subject to being embodied in a very small, compact valve actuating mechanism. In the small type contemplated, complete interchangeability of both casing and lever carrying mechanism for use as the liquid temperature valves or the pilot valve may be accomplished, the shifting of the pivot points being a sufficient distance to cause the thermal bar to impinge against the lever in one case outside of the pivot, and in the other, inside of the pivot, as just described in connection with the safety pilot arrangement.

From the foregoing description, it will be seen that in each instance the device compris a closed casing having inlet and outlet passages for fluid, the flow of which is to be controlled, that is, there is a gas passage to and from each closed chamber governed by a valve member and actuated by a lever assemblage of the same arrangement and construction, except for the slight modification or change which is made for the safety pilot valve where the valve is normally held open and is closed upon the failure of the pilot burner and the resulting cooling of the thermostatically responsive elements adjacent the pilot burner.

It will be seen that the simple broaching of each of these casings providing seats for the four corners of the stamped and pressed metal frame for the actuating levers permits the convenient assemblage and the accurate positioning of the main lever so that its pivot is at the proper desired predetermined distance from the center line of the thermal bar.

It is understood that the thermal bar or rod or like metal is illustrative of any actuating means, such bar being comparatively unresponsive to temperature changes, while the tube or casing for it may be of copper or other material having quality of relatively large expansion and contraction for the same temperature change. Other thermostatically responsive devices may be used for actuating the main lever.

It will be further seen that I have provided a simple, effective means for additionally adjusting the position of the lever carrying member by the eccentric pin and its operating member at 85 and 86.

It also will be seen that with the assemblage arranged as shown in Fig. 1, the operation of the usual hot water tank is made very safe and that the similarity of the parts used in the several valve actuating devices makes for uniformity and efficiency in manufacture. That a tank so equipped may be safely operated is obvious, the valve mechanism at 25 acting as the usual thermostat valve to control the temperature, usually maintained at about 140° F. Upon any failure of the regular operation of this valve and consequent rise in temperature of the water in the tank to, say 190° F., that is at any point which may be predetermined below the generation of steam pressure, the valve mechanism 90 will shut off the flow of gas to the burner 3. Such a condition will bring an attendant to the apparatus inasmuch as this valve cannot operate to open upon subsequent cooling by reason of the action of the locking device 92 and 95, which must be manually reset.

If for any reason the pilot light is extinguished, the cooling of the thermo-responsive means 101 causes the normally open valve of the device 100 to close and remain closed until the pilot is relighted, and this member again re-heated.

By the use of the shoulders and stops on the valve actuating lever and carrying frame, the snap action movement of these levers is definitely controlled, and variations in the machining of the valve seat, positioning of the valve, and other machining variations do not affect the operation and definiteness of the snap action movement.

It will be seen also that the flow of other fluids or gases and the heating of other liquids than water obviously may be regulated by devices of the present invention.

Various modifications and alterations may be made in the particular construction without departing from the spirit of my invention as defined in the appended claims.

Having thus described my invention, what I claim is:

1. In a thermostatic control device, a casing having an inlet opening and an outlet opening, a lever carrying frame fitted therein, a main lever adapted to be actuated by a thermostatic device, a secondary lever having a pivot seat on the main lever, a spring connected to said frame and to said secondary lever for effecting snap action, the frame having a plurality of pivot seats for selectively positioning said main lever, and a valve cooperating with one of said openings and adapted to be operated by said secondary lever.

2. In a thermostatic control device, a casing having an inlet opening and an outlet opening a lever carrying frame fitted in said casing, a main lever adapted to be actuated by a thermoresponsive means, a secondary lever having a pivot seat on the main lever, a valve cooperating with one of said openings and adapted to be operated by said secondary lever, a spring connected to said frame and to said secondary lever for effecting snap action, the frame having a plurality of pivot seats permitting selective positioning of said main lever, said selective positioning being for the purpose of obtaining snap action in the opening or in the closing of said valve, and a means for increasing the sensitivity of said thermo-responsive means in actuating said main lever.

3. In a thermostatic control device, a valve, a thermo-responsive means for operating the valve, a frame member, a compound lever mechanism operatively connecting the valve and thermo-responsive means, including a main lever, a secondary lever pivoted thereto, a spring connected to said frame and to the secondary lever for snapping said secondary lever in opposite directions respectively consequent upon movement of said main lever to predetermined positions, said thermo-responsive means operatively engaging the main lever for moving said main lever to one position consequent upon movement of the thermo-responsive means in a given direction for rendering the spring operative to move the secondary lever in a predetermined direction, the frame member having a plurality of separated pivot seats for the main lever, said plurality of seats allowing variable positioning of the main lever with relation to the thermo-responsive means, said variable positioning permitting opposite movement of the main lever for effecting opposite movement of the secondary lever by the spring consequent upon movement of the thermo-responsive means in said given direction.

4. In a thermostatic control device, a casing having a passage, a valve for controlling the passage, a main lever, a mounting frame for the main lever carried in the casing, a secondary lever pivoted onto said main lever and operatively connected to the valve for opening or closing the valve, a spring connected to the frame member and to the secondary lever for effecting snap action in the movement of the secondary lever in opening or closing said valve consequent upon movement of the main lever in opening or closing said valve consequent upon movement of the main lever in opposite directions respectively, a thermo-responsive means, said frame member having two separate pivot seats for receiving the main lever and for positioning the main lever in different operative relations with respect to the thermo-responsive means, respectively, and permitting movement of the main lever in one of said directions when the main lever is received on one seat and in the other of said directions when the main lever is received on the other seat.

5. In a thermostatic control device having a multiplying lever mechanism for actuating a valve and adapted to be actuated by the movement of a thermo-responsive means, the combination of a frame member having a pair of pivot seats, a main lever receivable on said seats selectively, a secondary lever operatively connected to the valve and pivoted on the main lever, the thermo-responsive means being adapted to engage said main lever, and a means connected to the frame member and said secondary lever for effecting snap action of the secondary lever in actuating said valve, selective seating of said main lever on said seats permitting engagement of the thermo-responsive means and main lever for effecting reverse actions of the main lever for the same action of the thermo-responsive means, whereby snap action in actuating said valve is effected in opposite directions selectively.

6. A thermostatic device for controlling a valve to be operated in response to temperature changes, a frame, a main lever operable by thermo-responsive means, a secondary lever having a pivot seat on the main lever, said secondary lever being adapted to actuate said valve consequent upon movement of the main lever to different positions, a dead center spring connected to the frame and to the secondary lever and acting directly through the pivot seat on the main lever when said main lever is in normal position whereby upon movement of the main lever out of normal position, the secondary lever is actuated by said spring, said frame having a plurality of pivot seats for the main lever onto which the lever may be selectively positioned, said seats being arranged respectively on each side of the line of action of the thermo-responsive means whereby the main lever may be actuated in opposite directions consequent upon the same action of the thermo-responsive means.

FRANK H. SCHOENFELD.